United States Patent
Lee

(10) Patent No.: US 11,587,286 B2
(45) Date of Patent: Feb. 21, 2023

(54) METHOD OF ADJUSTING GRID SPACING OF HEIGHT MAP FOR AUTONOMOUS DRIVING

(71) Applicants: Hyundai Motor Company, Seoul (KR); Kia Corporation, Seoul (KR)

(72) Inventor: Keon Chang Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/406,943

(22) Filed: Aug. 19, 2021

(65) Prior Publication Data
US 2022/0068017 A1     Mar. 3, 2022

(30) Foreign Application Priority Data
Aug. 26, 2020   (KR) .................. 10-2020-0108024

(51) Int. Cl.
*G06T 17/00*    (2006.01)

(52) U.S. Cl.
CPC .... *G06T 17/00* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 11,077,756 B2* | 8/2021 | Natroshvili | B60L 15/00 |
| 11,353,577 B2* | 6/2022 | Liu | G01S 13/867 |
| 2004/0153671 A1* | 8/2004 | Schuyler | G07C 9/28 726/9 |
| 2006/0008120 A1* | 1/2006 | Ohkubo | B60R 21/0134 382/103 |
| 2014/0074614 A1* | 3/2014 | Mehanian | G06Q 30/0267 705/14.64 |
| 2016/0148433 A1* | 5/2016 | Petrovskaya | G06T 19/006 345/633 |
| 2017/0247036 A1* | 8/2017 | Halder | G08G 1/168 |
| 2019/0047439 A1* | 2/2019 | Natroshvili | B60L 15/00 |
| 2019/0228239 A1* | 7/2019 | Wang | G06V 10/255 |
| 2020/0049511 A1* | 2/2020 | Sithiravel | G01C 21/28 |
| 2020/0225622 A1* | 7/2020 | Buerkle | G05D 1/0214 |
| 2021/0150720 A1* | 5/2021 | Kumar | G01C 21/26 |

FOREIGN PATENT DOCUMENTS

KR    10-2018-0068484 A    6/2018

* cited by examiner

*Primary Examiner* — Anh-Tuan V Nguyen
(74) *Attorney, Agent, or Firm* — Morgan, Lewis & Bockius LLP

(57) ABSTRACT

A method of adjusting a grid spacing of a height map for autonomous driving, may include acquiring a 2D image of a region ahead of a vehicle, generating a depth map using depth information on an object present in the 2D image, converting the generated depth map into a 3D point cloud, generating the height map by mapping the 3D point cloud onto a grid having a predetermined size, and adjusting a grid spacing of the height map in consideration of the driving state of the vehicle relative to the object.

11 Claims, 9 Drawing Sheets

METHOD OF ADJUSTING GRID SPACING OF HEIGHT MAP FOR AUTONOMOUS DRIVING

CROSS-REFERENCE TO RELATED APPLICATION

The present application claims priority to Korean Patent Application No. 10-2020-0108024, filed on Aug. 26, 2020, the entire contents of which is incorporated herein for all purposes by this reference.

BACKGROUND OF THE INVENTION

Field of the Invention

Embodiments relate to a method of adjusting a grid spacing of a height map for autonomous driving.

Description of Related Art

Recently developed autonomous vehicles use technology for recognizing an object by fusing various pieces of information output from sensors to convert a two-dimensional (2D) image into an occupancy-grid-based three-dimensional (3D) height map. The present height map recognizes an object through division into a free space area of a vehicle and a space area occupied by the object based on height information related to each cell of an occupancy grid having a predetermined size.

In the present height map, the accuracy of recognition of an object is determined depending on the spacing of the occupancy grid. The larger the spacing of the occupancy grid, the lower the resolution of disparity, whereby information on the 3D location of an object located a long distance away becomes inaccurate, resulting in deterioration in the reliability of autonomous driving control using the information.

Conversely, the smaller the spacing of the occupancy grid, the higher the accuracy of recognition of an object. However, it is impossible to indefinitely increase the resolution of disparity due to the limited data throughput of vehicle software, which is requested to perform real-time calculation. When calculation processing is delayed during autonomous driving, determination and control may not be implemented in time, leading to an accident.

Therefore, there is demand for the development of a method of adjusting the grid spacing of a height map to improve the accuracy of recognition of an object without reducing the determination speed of a system.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing to a method of adjusting a grid spacing of a height map for autonomous driving that substantially obviates one or more problems due to limitations and disadvantages of the related art.

Embodiments provide a method of appropriately adjusting a grid spacing of a height map for autonomous driving depending on a driving state of a vehicle to accurately recognize the motion of an object located in an area of interest and to improve the calculation speed of a system.

However, the objects to be accomplished by the exemplary embodiments are not limited to the above-mentioned objects, and other objects not mentioned herein will be clearly understood by those skilled in the art from the following description.

A method of adjusting a grid spacing of a height map for autonomous driving according to various exemplary embodiments of the present invention may include acquiring a 2D image of a region ahead of a vehicle, generating a depth map using depth information on an object present in the 2D image, converting the generated depth map into a 3D point cloud, generating the height map by mapping the 3D point cloud onto a grid having a predetermined size, and adjusting a grid spacing of the height map in consideration of the driving state of the vehicle relative to the object.

The generating may include determining the mean height using the number of 3D point clouds mapped onto each grid of the height map and height information.

The method may further include determining whether the object is a dynamic obstacle by accumulating a previous frame on the current frame of the height map according to motion information of the vehicle.

The determining may include performing random variable standardization in association with the mean height of each of cells forming the grid and comparing the standardized random variable with the boundary value of a specific standard deviation to detect a cell in which the dynamic obstacle is located.

The method may further include determining at least one of the relative distance between the dynamic obstacle and the vehicle or the time to collision of the vehicle with the dynamic obstacle.

The adjusting may include, when the relative distance is less than or equal to a predetermined first threshold value, adjusting a grid spacing of a cell in which the dynamic obstacle is located and a grid spacing of a neighboring cell adjacent to the cell in a first grid adjustment stage.

The adjusting may further include, when the time to collision is less than or equal to a predetermined second threshold value, adjusting a grid spacing of a cell in which the dynamic obstacle is located and a grid spacing of a neighboring cell adjacent to the cell in a second grid adjustment stage.

The grid spacing in the first grid adjustment stage and the grid spacing in the second grid adjustment stage may be different from each other.

When the dynamic obstacle is in plural to include a plurality of dynamic obstacles, the adjusting may include determining a priority of each of the dynamic obstacles, in consideration of each movement direction of the dynamic obstacles; and adjusting the grid spacing of each of the cells in a different manner according to the determined priority.

An apparatus of adjusting a grid spacing of a vehicular map according to various exemplary embodiments of the present invention may include a sensor configured to acquire a 2D image of a region ahead of a vehicle, an image processor configured to generate a depth map using depth information on an object present in the 2D image, to convert the generated depth map into a 3D point cloud, and to generate a height map by mapping the 3D point cloud onto a grid having a predetermined size, and a grid spacing adjuster configured to adjust a grid spacing of the height map in consideration of the driving state of the vehicle relative to the object.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
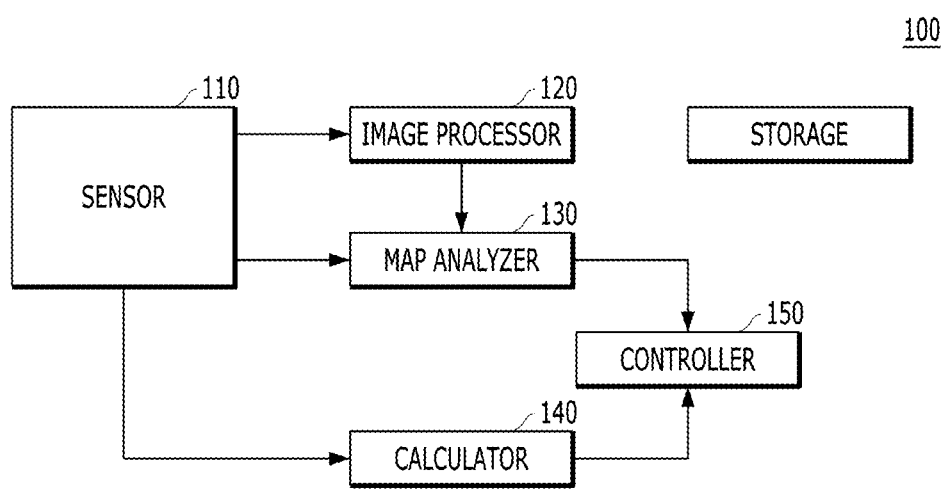
FIG. 1 is a block diagram showing a height map grid spacing adjustment apparatus according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Reference will now be made in detail to the embodiments, examples of which are illustrated in the accompanying drawings. While the present invention is susceptible to various modifications and alternative forms, specific embodiments thereof are shown by way of example in the drawings. However, the present invention may not be construed as being limited to the exemplary embodiments set forth herein, but on the other hand, the present invention is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. Furthermore, terms defined in consideration of the construction and operation of the exemplary embodiments are used only to describe the embodiments, but do not define the scope of the embodiments.

The terminology used herein is for describing various exemplary embodiments only and is not intended to be limiting of exemplary embodiments. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, a height map grid spacing adjustment apparatus according to an exemplary embodiment will be described with reference to the accompanying drawings.

FIG. 1 is a block diagram showing a height map grid spacing adjustment apparatus according to various exemplary embodiments of the present invention.

Referring to FIG. 1, the height map grid spacing adjustment apparatus 100 may include a sensor 110, an image processor 120, a map analyzer 130, a calculator 140, and a grid spacing adjuster 150.

The sensor 110 may include an external sensor for detecting objects present near the vehicle and measuring the distances to the objects and an internal sensor for measuring the driving state of the vehicle in real time.

The external sensor may include a camera for measuring depth information on objects and a distance measurement sensor. The exemplary embodiments are not limited to any specific type of external sensor, when the external sensor is configured for detecting objects and measuring distances.

The camera is a device configured for capturing an image of the surroundings of the vehicle. For example, the camera may be implemented as a stereo vision sensor, which is provided at the front side of the vehicle. The camera may transmit a stereo image of a region ahead of the vehicle to the image processor 120. At the instant time, the image processor 120 may transmit the stereo image transmitted from the camera to the map analyzer 130.

The distance measurement sensor may measure the distance from the vehicle to an object or the relative speed of the object, and may be implemented as a RaDAR sensor or a Light Detection and Ranging (LiDAR) sensor. A RaDAR sensor measures the distance to an object present near the vehicle, the heading of the object, the relative speed of the object, and the altitude of the object using electromagnetic waves, and is configured for achieving long-distance recognition and performing the functions thereof in bad weather. A LiDAR sensor radiates a laser pulse toward a region ahead of the vehicle on a road, and generates point-shaped LiDAR data from a laser pulse reflected from an object or the like. Such a LiDAR sensor has a precise resolution, and thus is mainly used to detect an object present near the vehicle.

The internal sensor may include a speed sensor, an acceleration sensor, and a steering angle sensor for respectively collecting the speed, the acceleration, and the steering angle of the vehicle, and may periodically measure information on the states of various actuators.

The internal sensor may include a speed sensor for measuring the driving speed of the vehicle, and may further include an accelerometer and a gyro sensor to detect motion information in 6 degrees of freedom. The internal sensor may periodically detect information on the states of various actuators. The accelerometer may measure movement displacements of the vehicle associated with translational degrees of freedom on the X, Y and Z axes. The gyro sensor may detect a roll angular speed, a pitch angular speed, and a yaw angular speed associated with rotational degrees of freedom on the three axes. The accelerometer may be provided on each of the three axes, and the gyro sensor may also be provided on each of the three axes.

The image processor 120 may obtain a 2D image of a region ahead of the vehicle from the camera of the sensor 110, and may generate a depth map using depth information on an object ahead obtained from the camera or the distance measurement sensor.

Furthermore, the image processor 120 may convert the depth map into a height map using location and depth information on the object ahead. The image processor 120 may convert the 2D image of a region ahead into a depth map based on depth information on the object ahead detected by the camera or the distance measurement sensor, and may further convert the depth map into a 3D height map using 2D location and depth information on the object ahead.

Here, the image processor 120 may convert the depth map into a 3D point cloud, and may further convert the 3D point cloud into a height map.

In other words, the image processor 120 may detect 3D location information on objects ahead based on the 2D image of a region ahead and the depth information on the objects ahead, and may convert the depth map into a 3D point cloud based on the detected 3D location information.

At the present time, the image processor 120 may detect the depth information on an object present in the 2D image using a stereo triangulation scheme. This will be described with reference to FIG. 2.

Figure 2:
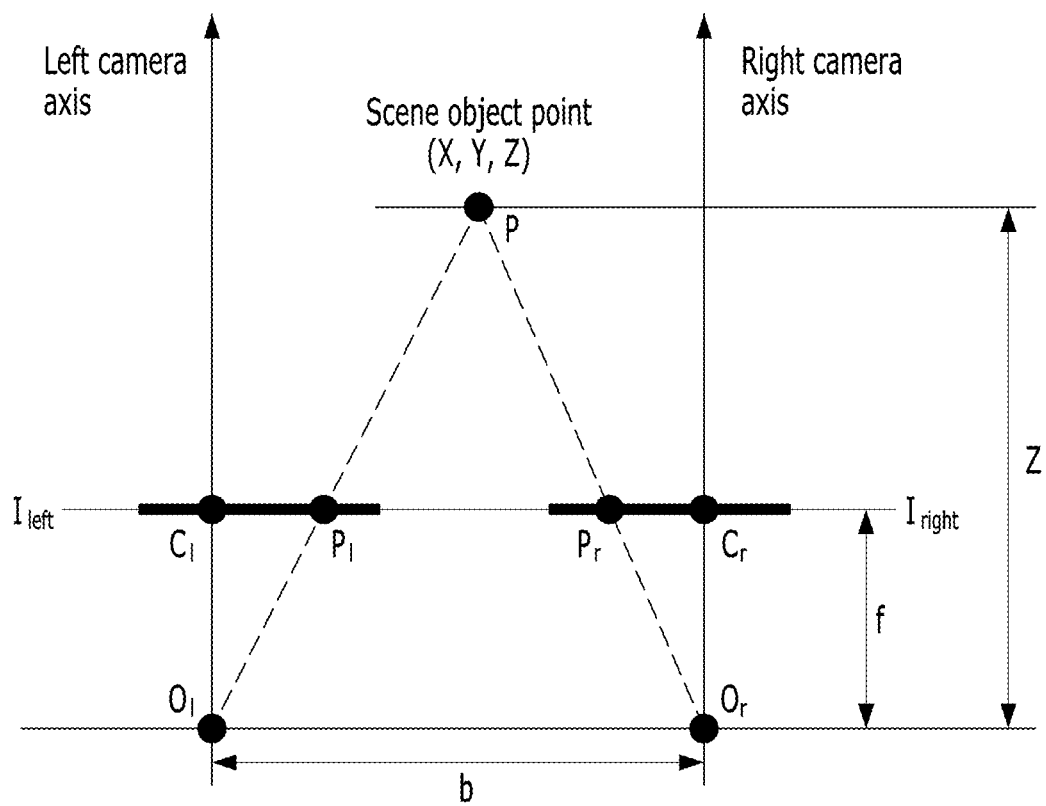
FIG. 2 is a diagram showing a process of detecting depth information on an object present in a 2D image using a stereo triangulation scheme according to various exemplary embodiments of the present invention.

FIG. 2 is a diagram showing a process of detecting depth information on an object present in a 2D image using a stereo triangulation scheme according to various exemplary embodiments of the present invention.

As shown in FIG. 2, the stereo triangulation scheme may detect image center points $C_l$ and $C_r$ of a stereo image, i.e., a left image $I_{left}$ and a right image $I_{right}$, center points $O_l$ and $O_r$ of cameras respectively corresponding to the image center points $C_l$ and $C_r$, and a point P, at which line segments respectively connecting the center points $O_l$ and $O_r$ of the cameras to corresponding points $P_l$ and $P_r$ of the left image $I_{left}$ and the right image $I_{right}$ meet, as corresponding points.

In the instant case, the image processor 120 may extract the vertical distance from the point P to each camera as depth information Z. In FIG. 2, the depth information Z may be defined as in Equation 1 below.

$$Z = b\frac{f}{d} \quad \text{[Equation 1]}$$

In Equation 1, f represents the focal length of each camera, b represents the distance between the left camera and the right camera, and d represents the disparity between the left camera and the right camera.

In the present manner, the image processor 160 may convert the depth map into a 3D point cloud based on 3D location information detected based on depth information obtained from a 2D image.

Furthermore, the image processor 120 may map the 3D point cloud onto a grid having a predetermined size, may determine the mean height value of the 3D point cloud, and may add the mean height value as height information on the grid, generating a height map. Hereinafter, a process of generating a height map from a 3D point cloud will be described with reference to FIG. 3 and FIG. 4.

Figure 3:
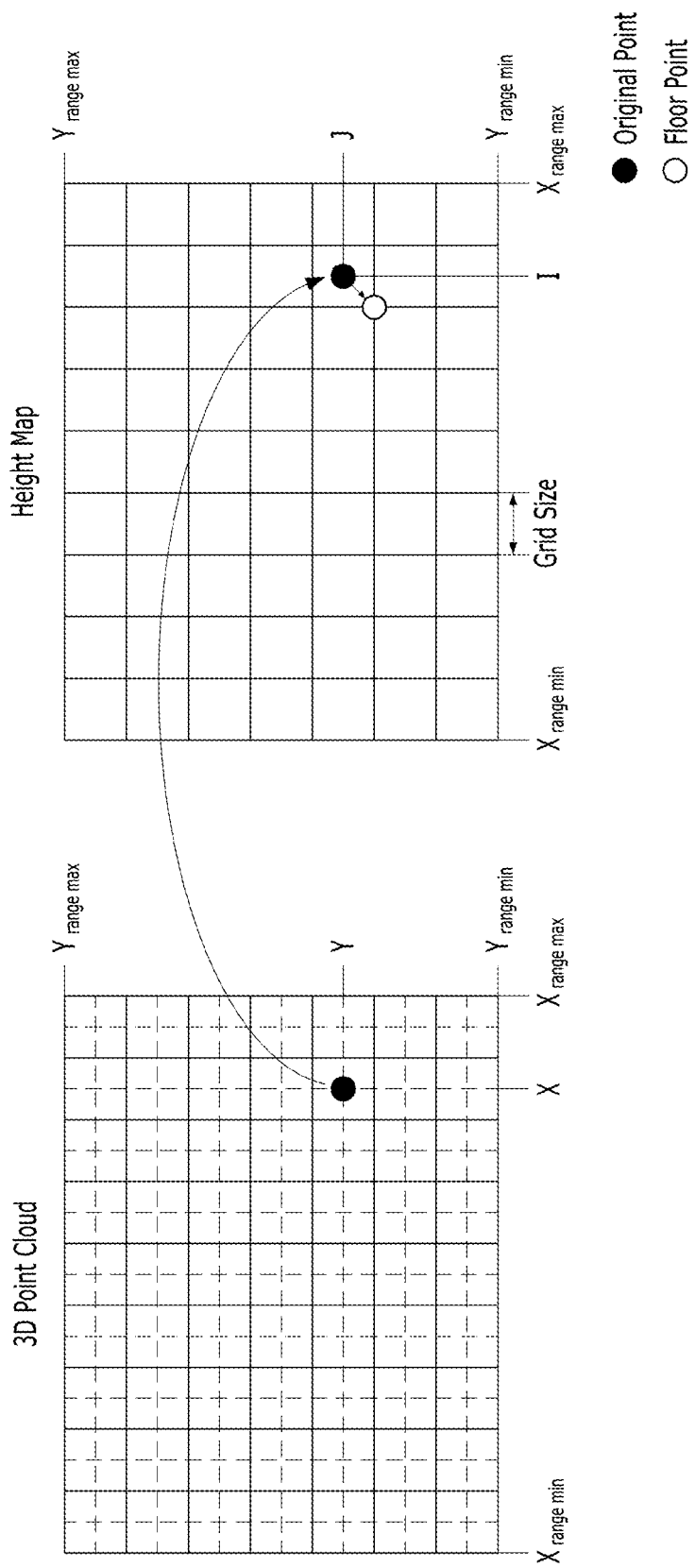
FIG. 3 and FIG. 4 are diagrams showing a process of generating a height map according to various exemplary embodiments of the present invention.
Figure 4:
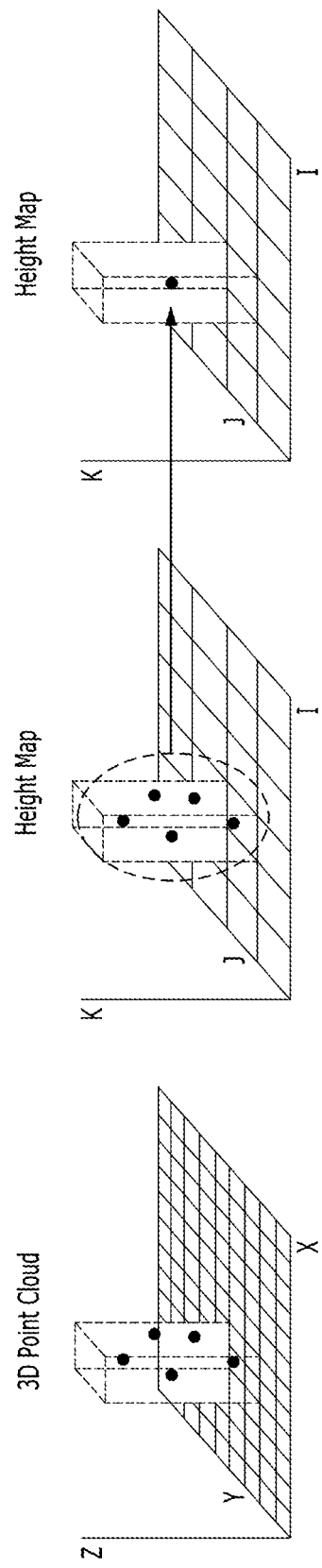

FIG. 3 and FIG. 4 are diagrams showing a process of generating a height map according to various exemplary embodiments of the present invention.

Referring to FIG. 3, the image processor 120 may generate a height map by mapping a point corresponding to coordinates (X, Y) of a 3D point cloud onto coordinates (I, J) of a grid having a predetermined size. Here, I represents the X-axis coordinate of the height map, and J represents the Y-axis coordinate of the height map. I and J may be defined as in Equations 2 and 3 below.

$$I = \text{Floor}(\text{Point Cloud}(X) - \text{Height Map}(X_{range\ min})) \times \text{Grid Size} \quad \text{[Equation 2]}$$

$$J = \text{Floor}(\text{Point Cloud}(Y) - \text{Height Map}(Y_{range\ min})) \times \text{Grid Size} \quad \text{[Equation 3]}$$

In Equations 2 and 3, Point Cloud represents the coordinates of the 3D point cloud, $X_{range\ min}$ represents the minimum value of the X-coordinate area, $Y_{range\ min}$ represents the minimum value of the Y-coordinate area, and Grid Size represents the size of each of cells forming the grid of the height map.

When the 3D point cloud is mapped onto the height map, some coordinates may not be mapped onto integer coordinates of the height map. In the instant case, these coordinates may be mapped onto integer coordinates of the height map by rounding down the same (refer to "Floor Point" in FIG. 3).

Meanwhile, when the 3D point cloud is mapped onto the height map, the height information present on the Z-axis of the 3D point cloud may be expressed as mean height information.

Referring to FIG. 4, the image processor 120 may determine the mean height using the number of 3D point clouds mapped onto the grid of the height map and the height information thereof, as expressed using Equation 4 below.

$$K = \frac{\sum \text{Point Cloud}(Z) \text{ at Height Map}}{\sum \text{Number of Points at Height Map}} \quad \text{[Equation 4]}$$

In Equation 4, K represents the Z-axis coordinate of the height map, Number of Points represents the number of 3D point clouds, and Point Cloud (Z) represents the height information on the 3D point cloud.

The map analyzer 130 analyzes the height map generated by the image processor 120 to recognize a travelable area and an object. This will be described with reference to FIG. 5.

Figure 5:
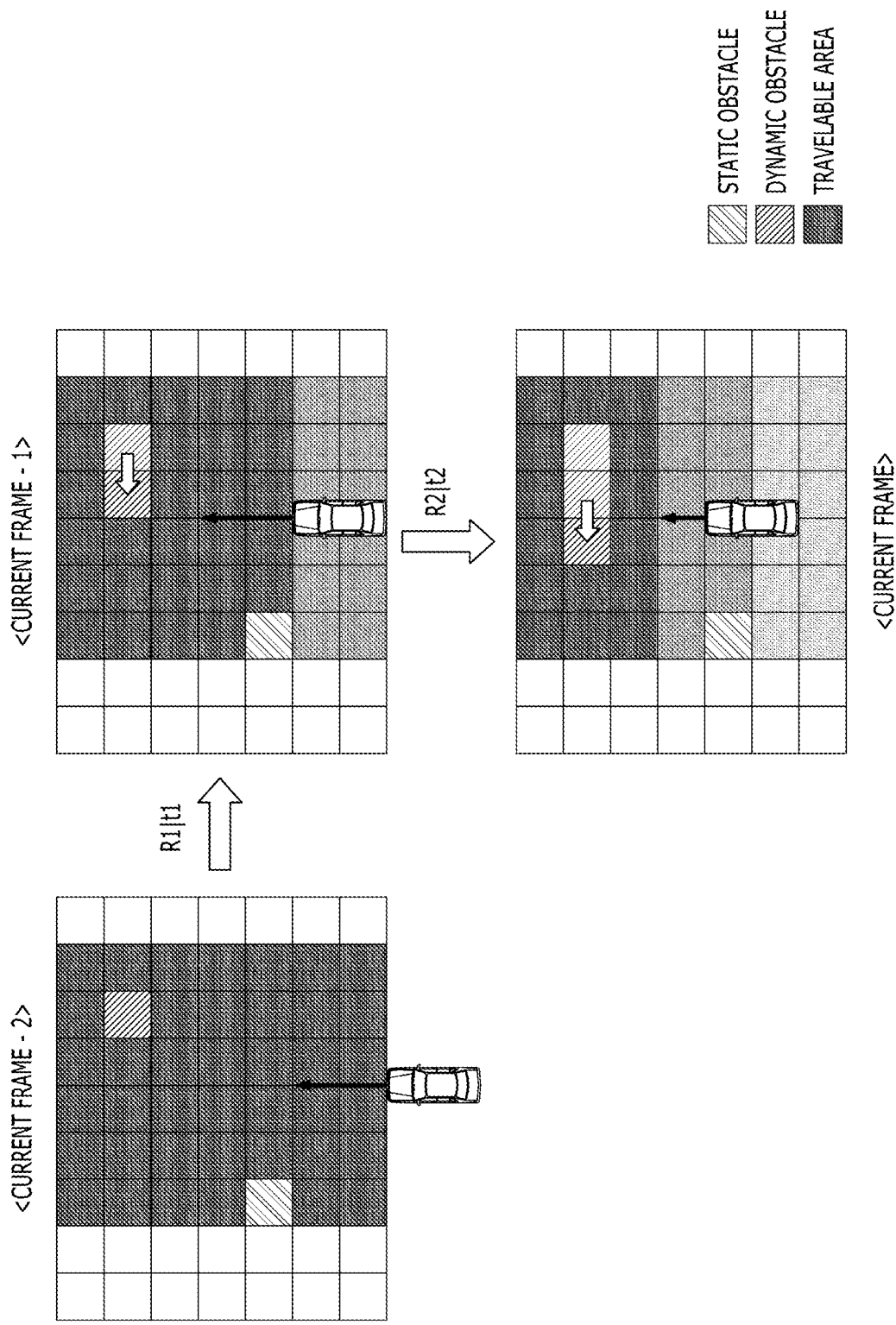
FIG. 5 is a diagram showing a process of recognizing an object using a height map according to various exemplary embodiments of the present invention.

FIG. 5 is a diagram showing a process of recognizing an object using a height map according to various exemplary embodiments of the present invention.

Referring to FIG. 5, the map analyzer 130 may estimate a road by extracting a point present at the lowest position in the height map. If the road is flat, the map analyzer 130 may determine an equation of a plane representing a point present at the lowest position in the height map using a RANdom SAmple Consensus (RANSAC) algorithm.

The map analyzer 130 recognizes a travelable area based on the road estimated from the height map, and recognizes points present at positions higher than the road as objects. Here, the map analyzer 130 may display a travelable area and an object on the height map associated with the image of an area ahead.

Furthermore, the map analyzer 130 may determine the dynamic characteristics of an object by accumulating a previous frame on the current frame of the height map using motion information of the vehicle. For example, if the height map is observed in the state in which a previous frame is accumulated on the current frame thereof, a static obstacle is always located at the same position, whereas a dynamic obstacle is not located at the same position, unlike the static obstacle.

The map analyzer 130 may detect motion information of the vehicle in 6 degrees of freedom using the internal sensor, and may accumulate a previous frame on the current frame of the height map through a rotation/movement transformation matrix [R|t]. Here, the rotation/movement transformation matrix [R|t] may be defined as in Equation 5 below.

$$\begin{bmatrix} X' \\ Y' \\ Z' \end{bmatrix} = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \end{bmatrix} = [R \mid t] \begin{bmatrix} X \\ Y \\ Z \end{bmatrix} \quad \text{[Equation 5]}$$

In Equation 5, (X', Y', Z') represents the location of the vehicle in the current frame present in the 3D orthogonal coordinate system, (X, Y, Z) represents the location of the vehicle in the previous frame present in the 3D orthogonal coordinate system, R represents the rotational degrees of freedom on the three axes (roll, pitch, and yaw), and t represents the translational degrees of freedom on the three axes (movement displacement).

The map analyzer 130 may generate a standard normal distribution of height information on each cell of the height map, in which the previous frame and the current frame are accumulated, and may determine that a dynamic obstacle is present in a corresponding cell when height information present outside a specific standard deviation range is input thereto. This will be described with reference to FIG. 6.

Figure 6:
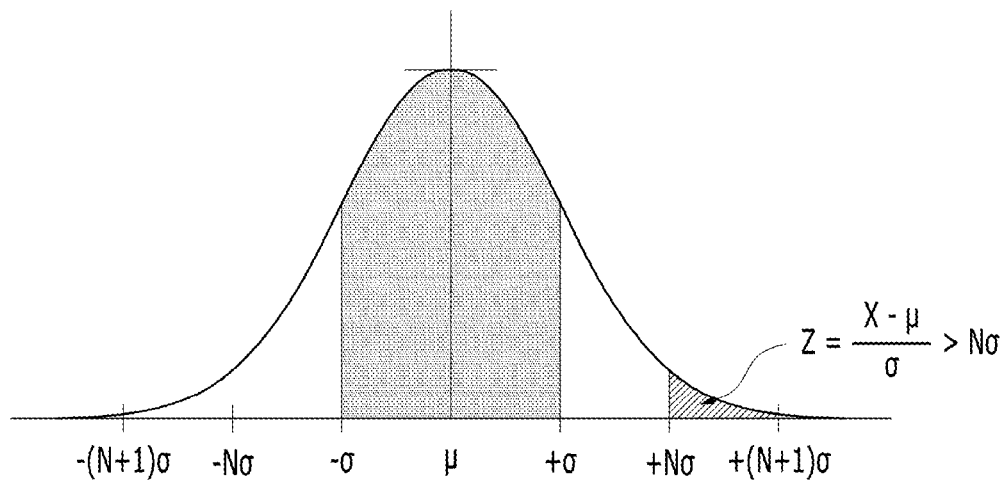
FIG. 6 is a diagram showing a standard normal distribution of height information accumulated in each cell of a height map according to various exemplary embodiments of the present invention.

FIG. 6 is a diagram showing a standard normal distribution of height information accumulated in each cell of the height map according to various exemplary embodiments of the present invention.

Referring to FIG. 6, the map analyzer 130 generates a standard normal distribution of the height information accumulated in each cell of the height map, and determines that a dynamic obstacle is present in a corresponding cell when height information present outside a specific standard deviation range $N\sigma$ is input thereto.

In general, because an object is present on the road surface, the object has a height greater than that of the travelable area. When observing the height map in which the previous frame and the current frame are accumulated, if a travelable area in the previous frame changes to a non-travelable area in the current frame due to a dynamic obstacle, the mean value of the heights accumulated in a corresponding cell increases. Therefore, when a standard normal distribution is generated in association with information on the heights accumulated in each cell of the height map, the height information on the cell in which a dynamic obstacle is present is located in a standard normal distribution having a large standard deviation $\sigma$.

The map analyzer 130 may perform random variable standardization Z in association with the height information on each of the cells forming the height map, and may detect a cell satisfying Equation 6 below.

$$Z = \frac{X - \mu}{\sigma} > N\sigma \quad \text{[Equation 6]}$$

In Equation 6, Z represents the value of the random variable standardization, X represents a random variable, $\mu$ represents the mean value of the height information on a travelable area or a static obstacle, $\sigma$ represents the standard deviation of the height information on the travelable area or the static obstacle, and N represents the boundary value of the standard deviation. At the instant time, the boundary value N of the standard deviation for detecting a dynamic obstacle is set through experimentation.

As shown, the height information on the cell corresponding to the travelable area or the static obstacle is distributed near the mean value, but the height information on the cell corresponding to the dynamic obstacle is located in a specific area (red) having a large standard deviation. The map analyzer 130 may detect the dynamic obstacle through standard normal distribution of height information on each cell.

Meanwhile, the calculator 140 may determine the distance between the dynamic obstacle, detected by the map analyzer 130, and the vehicle and the time to collision (TTC). Here, TTC may be defined as in Equation 7 below.

$$TTC = \frac{d}{V_{ego} - V_{object}} \quad \text{[Equation 7]}$$

In Equation 7, d represents the relative distance, $V_{ego}$ represents the speed of the vehicle, and $V_{object}$ represents the speed of the detected dynamic obstacle.

The grid spacing adjuster 150 may adjust the grid spacing of the height map in consideration of the driving state of the vehicle. Reduction of the grid spacing of the height map increases the resolution, thus improving the accuracy of detection of a dynamic obstacle that moves less, but increases the amount of calculation. Accordingly, the grid spacing adjuster 150 appropriately adjusts the grid spacing of a cell adjacent to a dynamic obstacle according to the driving state of the vehicle, rather than reducing the grid spacing of every cell of the height map. This will be described with reference to FIGS. 7 and 8.

Figure 7:
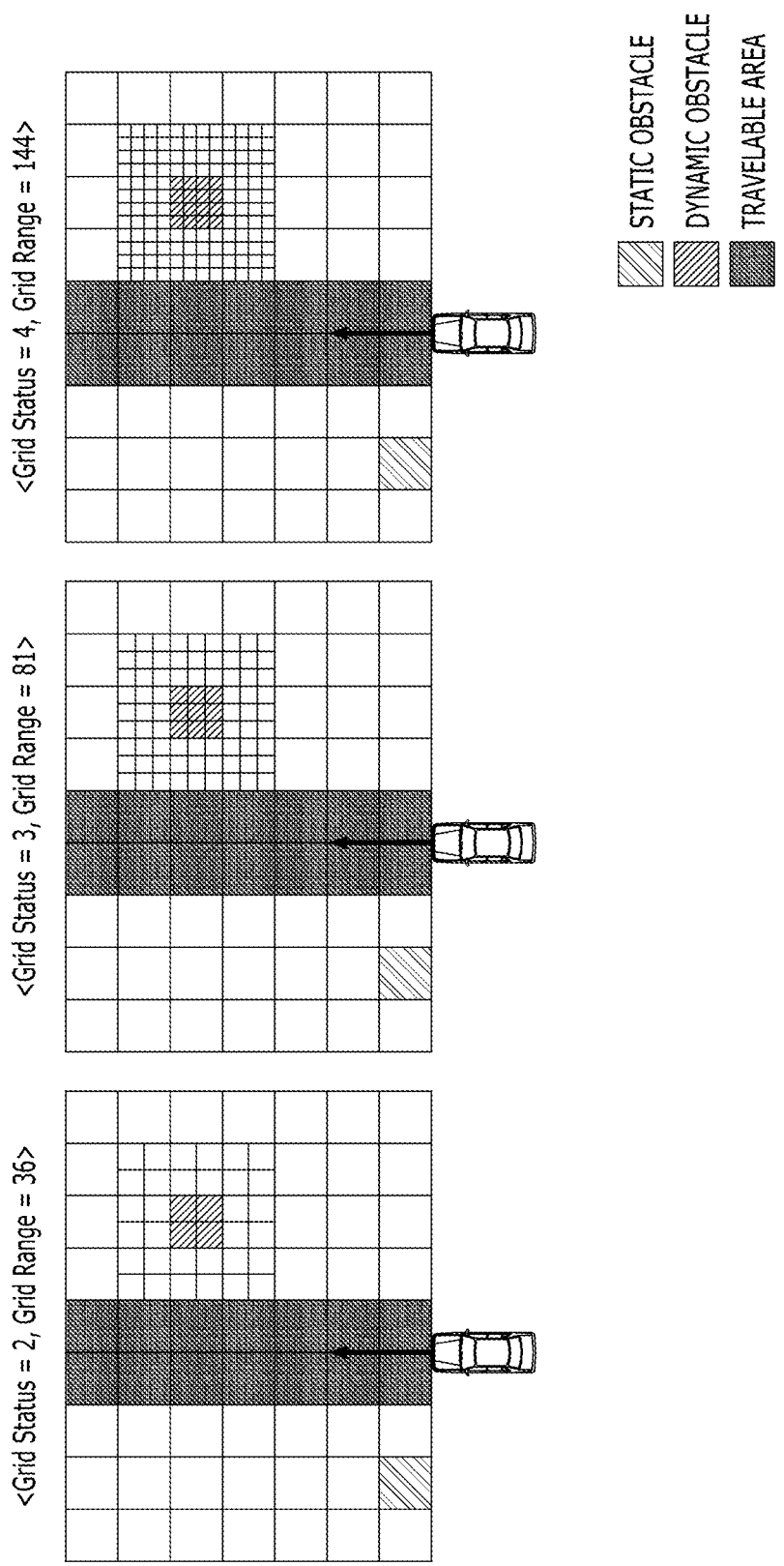
FIG. 7 is a diagram showing a process of adjusting a grid spacing of a height map according to various exemplary embodiments of the present invention.

FIG. 7 is a diagram showing a process of adjusting a grid spacing of a height map according to various exemplary embodiments of the present invention.

Referring to FIG. 7, the grid spacing adjuster 150 receives, from the map analyzer 130, information on a height map, in which a plurality of frames is accumulated, and a cell in which a dynamic obstacle is located. Furthermore, the grid spacing adjuster 150 receives, from the calculator 140, calculation information related to the distance to the dynamic obstacle and the time to collision (TTC). The grid spacing adjuster 150 may variably adjust the grid spacing of the cell in which the dynamic obstacle is located and the grid spacing of a neighboring cell adjacent to the corresponding cell.

At the present time, a grid adjustment stage Grid Status includes a total of n stages (where n is an integer of 2 or more). The adjusted grid spacing and the grid adjustment range according to the grid adjustment stage Grid Status may be defined as in Equation 8 below.

$$\text{Grid Size}_{adj} = \text{Grid Size}_{int}/n$$

$$\text{Grid Range} = n^2 \times 9 \quad \text{[Equation 8]}$$

Here, Grid Size$_{adj}$ represents the adjusted grid spacing, Grid Size$_{int}$ represents the initial grid spacing, Grid Range represents the grid adjustment range, and n represents the upper limit value of the grid adjustment stage Grid Status (i.e., the number of the grid adjustment stages). The upper limit value n of the grid adjustment stage Grid Status may be directly determined by the system designer through experimentation, and the grid spacing adjuster 150 may set the grid adjustment range Grid Range based on the corresponding cell in consideration of an estimation error of the sensor and the amount of information, which is reduced using the height map.

As shown in FIG. 7, as the grid adjustment stage Grid Status is set to be higher, the grid adjustment range Grid Range increases, and the adjusted grid spacing Grid Size$_{adj}$ decreases, so that the accuracy of detection of a dynamic obstacle or the resolution may be improved. For example, when the grid adjustment stage is set to 2 (Grid Status=2), the grid adjustment range is 36. On the other hand, when the grid adjustment stage is set to 4 (Grid Status=4), the grid adjustment range greatly increases to 144.

Accordingly, the grid spacing adjuster 150 may improve the resolution in the manner of setting the grid adjustment stage Grid Status to be higher as the risk of collision with a dynamic obstacle is higher. This will be described with reference to FIG. 8.

Figure 8:
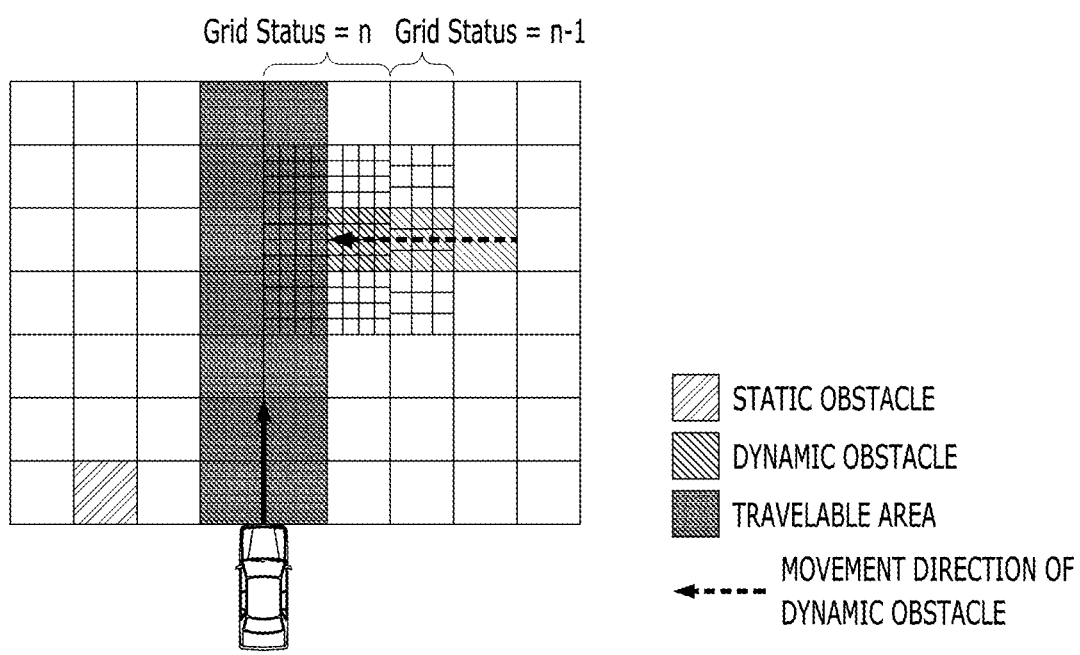
FIG. 8 is a diagram showing a process of adjusting a grid spacing of a height map according to another exemplary embodiment of the present invention.

FIG. 8 is a diagram showing a process of adjusting a grid spacing of a height map according to another exemplary embodiment of the present invention.

Referring to FIG. 8, the grid spacing adjuster 150 may estimate the movement direction of a dynamic obstacle by accumulating a previous frame on the current frame of the height map, and may variably adjust the grid adjustment stage Grid Status according to the risk of collision in consideration of the movement direction of the dynamic obstacle.

The grid spacing adjuster 150 may set the grid adjustment stage of the cell to which the dynamic obstacle is predicted to move in the future from the cell in which the dynamic obstacle is currently located to "n", and may apply a n−1$^{th}$ or lower grid adjustment stage to the cell through which the dynamic obstacle has passed. That is, the grid spacing adjuster 150 may appropriately adjust the grid spacing of the height map according to the driving state of the vehicle, facilitating accurate recognition of the motion of the object located in the area of interest and reduction in the amount of calculation, thus increasing the calculation speed of the system.

On the other hand, when a plurality of dynamic obstacles is present in front of the vehicle, the grid spacing adjuster 150 determines the priority in consideration of the distance to each dynamic obstacle and the time to collision of the vehicle with the dynamic obstacle. A higher grid adjustment stage may be applied to a dynamic obstacle having a higher priority, and a lower grid adjustment stage may be applied to a dynamic obstacle having a lower priority.

Hereinafter, a height map grid spacing adjustment method will be described with reference to FIG. 9.

Figure 9:
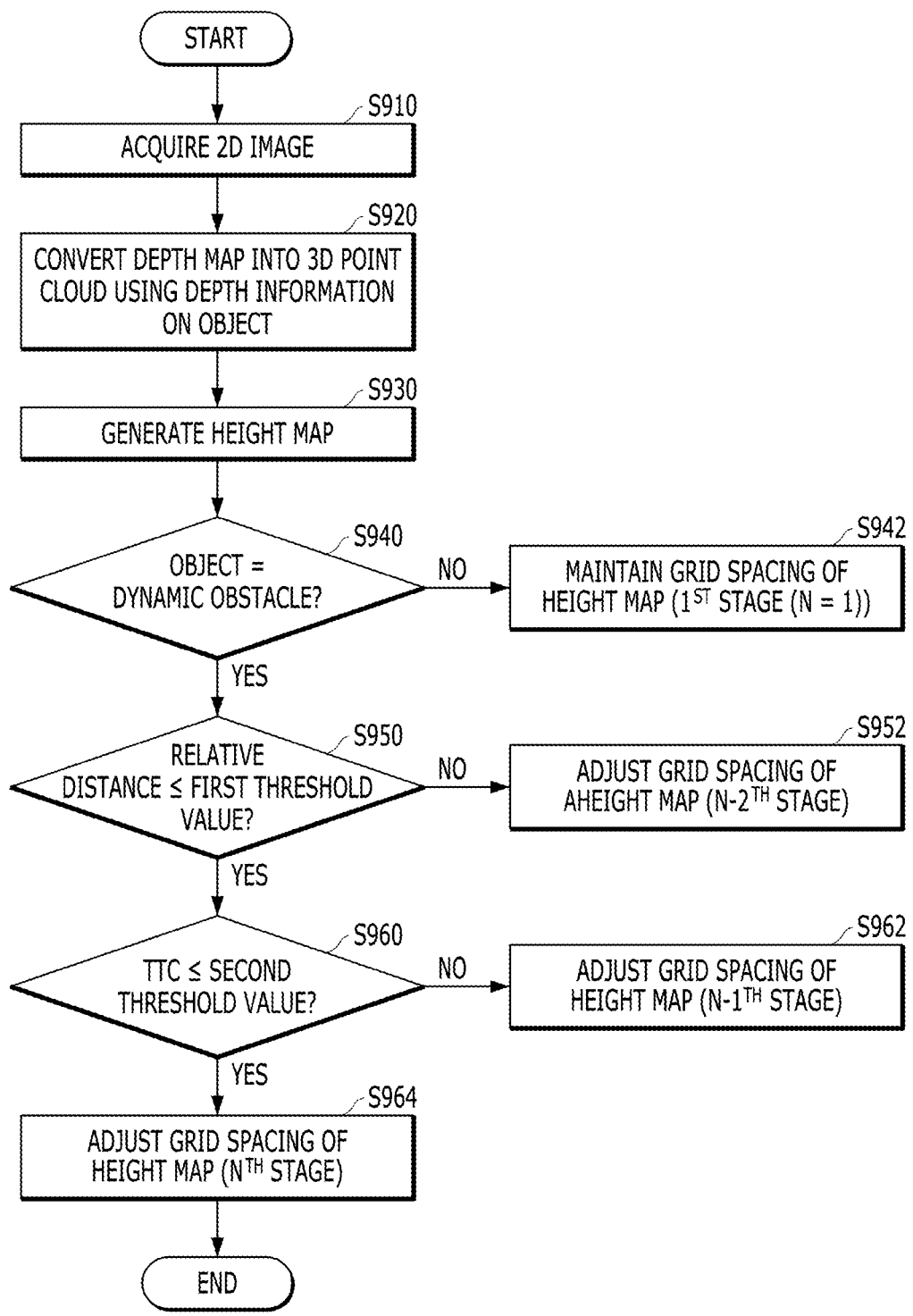
FIG. 9 is a flowchart of a height map grid spacing adjustment method according to various exemplary embodiments of the present invention.

FIG. 9 is a flowchart of a height map grid spacing adjustment method according to various exemplary embodiments of the present invention.

Referring to FIG. 9, a 2D image of a region ahead of the vehicle may be acquired using the sensor 110 (S910).

Thereafter, a depth map may be generated using depth information on an object present in the 2D image, and the depth map may be converted into a 3D point cloud (S920).

Subsequently, the 3D point cloud may be mapped onto a grid having a predetermined size to generate a height map (S930).

Thereafter, a previous frame may be accumulated on the current frame of the generated height map to determine whether the object is a dynamic obstacle (S940).

When the object is a static obstacle (No in S940), the grid spacing of the height map may be maintained in an initial state (S942).

On the other hand, when the object is a dynamic obstacle (Yes in S940), the relative distance between the vehicle and the dynamic obstacle may be determined, and whether the relative distance is less than or equal to a first threshold value may be determined (S950).

When the relative distance is greater than the first threshold value (No in S950), the height map grid adjustment stage may be set to "n−2", and the grid spacing may be adjusted based on the cell in which the dynamic obstacle is located (S952). Here, n represents the upper limit value of the grid adjustment stage.

On the other hand, when the relative distance is less than or equal to the first threshold value (Yes in S950), the time to collision (TTC) between the vehicle and the dynamic obstacle may be determined, and whether the time to collision is less than or equal to a second threshold value may be determined (S960).

When the time to collision is greater than the second threshold value (No in S950), the height map grid adjustment stage may be set to "n−1", and the grid spacing may be adjusted based on the cell in which the dynamic obstacle is located (S962).

On the other hand, when the time to collision is less than or equal to the second threshold value (No in S950), the height map grid adjustment stage may be set to "n", and the grid spacing may be adjusted based on the cell in which the dynamic obstacle is located (S964).

The first and second threshold values and the upper limit value n of the grid adjustment stage described above may be directly determined by a system designer through experimentation.

In an exemplary embodiment of the present invention, the image processor 120, the map analyzer 130, the calculator 140 and the grid spacing adjuster 150 may be integrated into a single controller.

The height map grid spacing adjustment method according to the above-described embodiment may be implemented as a program which is to be executed in a computer, and may be stored in a computer-readable recording medium, and examples of the computer-readable recording medium may include Read-Only Memory (ROM), Random Access Memory (RAM), Compact Disk ROM (CD-ROM), a magnetic tape, a floppy disc, and an optical data storage.

The computer-readable recording medium can also be distributed over network-connected computer systems so that the computer-readable code is stored and executed in a distributed fashion. Also, functional programs, code, and code segments for accomplishing the above-described method may be easily devised by programmers skilled in the art to which the exemplary embodiments pertain.

As is apparent from the above description, according to at least an exemplary embodiment configured as described above, a grid spacing of a height map may be appropriately adjusted according to the driving state of a vehicle, facilitating accurate recognition of the motion of an object located in an area of interest and reduction in the amount of determination, thus increasing the determination speed of a system.

However, the effects achievable through the present invention are not limited to the above-mentioned effects, and other effects not mentioned herein will be clearly understood by those skilled in the art from the above description.

Although only a limited number of embodiments have been described above, various other embodiments are possible. The technical contents of the above-described embodiments may be combined into various forms as long as they are not incompatible with one another, and thus may be implemented in new embodiments.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of adjusting a grid spacing of a height map for autonomous driving, the method comprising:
   acquiring a 2D image of a region ahead of a vehicle;
   generating a depth map using depth information on an object present in the 2D image and converting the generated depth map into a 3D point cloud;
   generating the height map by mapping the 3D point cloud onto a grid having a predetermined size; and
   adjusting the grid spacing of the height map according to a driving state of the vehicle relative to the object,
   wherein the generating the height map includes determining a mean height using a number of 3D point clouds mapped onto each grid of the height map and height information,
   wherein the method further includes determining whether the object is a dynamic obstacle by accumulating a previous frame on a current frame of the height map according to motion information of the vehicle, and
   wherein the determining whether the object is a dynamic obstacle includes:
      performing random variable standardization in association with a mean height of each of cells forming the grid; and
      comparing a standardized random variable with a boundary value of a specific standard deviation to detect a cell in which the dynamic obstacle is located, among the cells,
   wherein the dynamic obstacle is in plural to include a plurality of dynamic obstacles, and wherein the adjusting the grid spacing of the height map includes:
  determining a priority of each of the dynamic obstacles, in consideration of each movement direction of the dynamic obstacles; and
  adjusting differently grid spacing of each of the cells according to the determined priority.

2. The method of claim 1, further including:
determining at least one of a relative distance between the dynamic obstacle and the vehicle or a time to collision of the vehicle with the dynamic obstacle.

3. The method of claim 2, wherein the adjusting the grid spacing of the height map includes:
  when the relative distance is less than or equal to a predetermined first threshold value, adjusting a grid spacing of a cell in which the dynamic obstacle is located and a grid spacing of a neighboring cell adjacent to the cell in a first grid adjustment stage, among the cells.

4. The method of claim 3, wherein the adjusting the grid spacing of the height map further includes:
  when the time to collision is less than or equal to a predetermined second threshold value, adjusting a grid spacing of a cell in which the dynamic obstacle is located and a grid spacing of a neighboring cell adjacent to the cell in a second grid adjustment stage, among the cells.

5. The method of claim 4, wherein a grid spacing in the first grid adjustment stage and a grid spacing in the second grid adjustment stage are different from each other.

6. A non-transitory computer-readable recording medium in which a program configured to be executed by a processor to perform the method of claim 1 is recorded.

7. An apparatus of adjusting a grid spacing of a vehicular map, the apparatus comprising:
  a sensor configured to acquire a 2D image of a region ahead of a vehicle;
  an image processor configured to generate a depth map using depth information on an object present in the 2D image, to convert the generated depth map into a 3D point cloud, and to generate a height map by mapping the 3D point cloud onto a grid having a predetermined size; and
  a grid spacing adjuster including a processor configured to adjust a grid spacing of the height map according to a driving state of the vehicle relative to the object,
  wherein the image processor is configured to determine a mean height using a number of 3D point clouds mapped onto each grid of the height map and height information,
  wherein the apparatus further includes a map analyzer including a processor configured to determine whether the object is a dynamic obstacle by accumulating a previous frame on a current frame of the height map according to motion information of the vehicle,
  wherein the map analyzer is configured to perform random variable standardization in association with a mean height of each of cells forming the grid, and to compare a standardized random variable with a boundary value of a specific standard deviation to detect a cell in which the dynamic obstacle is located, among the cells,
  wherein the dynamic obstacle is in plural to include a plurality of dynamic obstacles, and
  wherein the grid spacing adjuster is configured to determine a priority of each of the dynamic obstacles, in consideration of each movement direction of the dynamic obstacles and to adjust grid spacing of each of the cells differently according to the determined priority.

8. The apparatus of claim 7, further including:
a calculator including a processor configured to determine at least one of a relative distance between the dynamic obstacle and the vehicle or a time to collision of the vehicle with the dynamic obstacle.

9. The apparatus of claim 8, wherein, when the relative distance is less than or equal to a predetermined first threshold value, the grid spacing adjuster is configured to adjust a grid spacing of a cell in which the dynamic obstacle is located and a grid spacing of a neighboring cell adjacent to the cell in a first grid adjustment stage, among the cells.

10. The apparatus of claim 9, wherein, when the time to collision is less than or equal to a predetermined second threshold value, the grid spacing adjuster is configured to adjust a grid spacing of a cell in which the dynamic obstacle is located and a grid spacing of a neighboring cell adjacent to the cell in a second grid adjustment stage, among the cells.

11. The apparatus of claim 10, wherein a grid spacing in the first grid adjustment stage and a grid spacing in the second grid adjustment stage are different from each other.

* * * * *